April 21, 1964     H. HODKINSON     3,129,789
BRAKES AND WEAR COMPENSATING MECHANISM FOR BRAKES
Filed June 12, 1961     3 Sheets-Sheet 1

INVENTOR
Harold Hodkinson
by Benj. T. Rauber
Attorney

April 21, 1964 H. HODKINSON 3,129,789
BRAKES AND WEAR COMPENSATING MECHANISM FOR BRAKES
Filed June 12, 1961 3 Sheets-Sheet 3
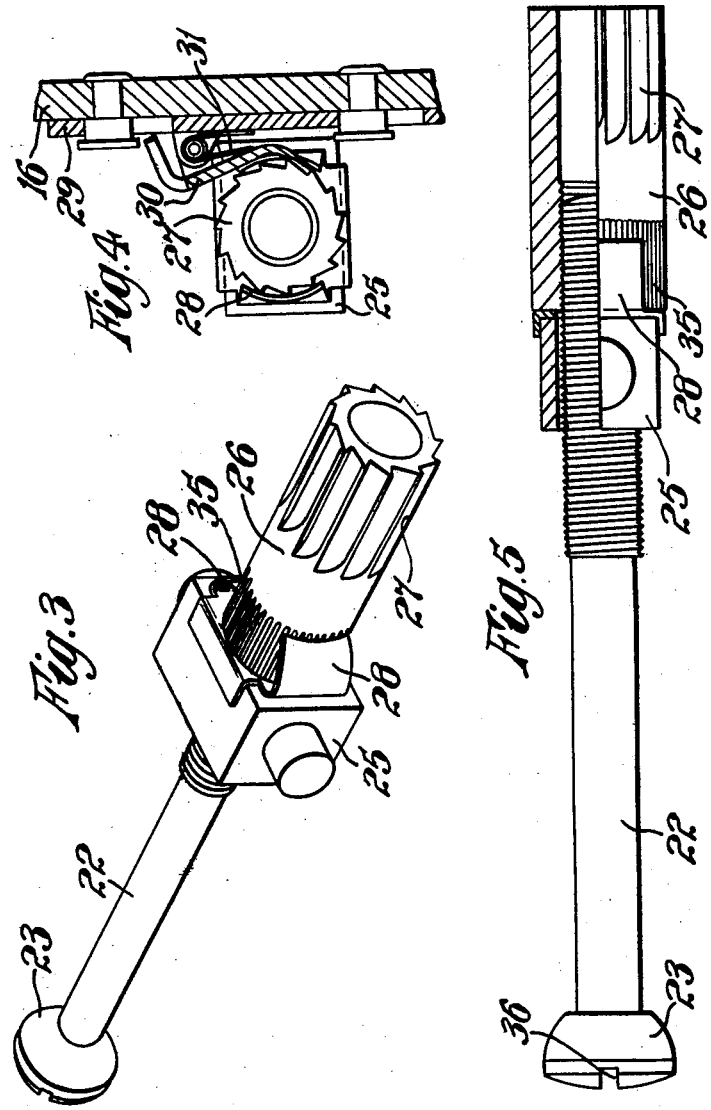
INVENTOR
Harold Hodkinson
by Benj. T. Rauber
Attorney United States Patent Office 3,129,789
Patented Apr. 21, 1964

3,129,789
BRAKES AND WEAR COMPENSATING
MECHANISM FOR BRAKES
Harold Hodkinson, Coventry, England, assignor to Dunlop Rubber Company Limited, a British company
Filed June 12, 1961, Ser. No. 116,316
Claims priority, application Great Britain June 25, 1960
8 Claims. (Cl. 188—72)

This invention relates to wear compensating mechanisms for brakes and to disc brakes comprising automatic wear-compensating mechanisms and more particularly relates to a disc brake of the kind comprising angularly-movable pressure plates axially aligned one on each side of the disc.

The object of the present invention is to provide improvements in disc brakes of this kind.

According to the present invention a disc brake comprises a rotatable disc, angularly movable pressure plates axially-aligned one on each side of the disc and having facings or pads of friction material associated therewith to frictionally engage the braking surfaces of the disc and a mechanism for effecting frictional engagement comprising a bifurcated lever member associated with one of said pressure plates and an operating rod extending adjacent a periphery of the disc and associated at one end with said bifurcated lever member and at the end with the other of said pressure plates wherein the lever member is provided with a spring-urged pawl engageable with a ratchet wheel formed on the outer periphery of a nut screwed on to the operating rod, the arrangement being that angular movement of the lever member beyond a predetermined distance to apply the brake repositions the pawl behind a fresh tooth on the ratchet wheel so that, on return of the lever member to the inoperative position, the nut is turned on the operating rod to compensate for wear of the friction material.

Preferably the pressure plates are pivotably associated at one end with a non-rotatable caliper straddling a periphery of the disc and the lever-member is angularly movable by cable or like means so that it may be used as a hand-brake.

One of the embodiments of the invention will now be described with reference to the accompanying drawings of which:

FIGURE 3 is a perspective view showing the operating rod, trunnion block, and adjusting nut.

FIGURE 4 is an enlarged view of the pawl and ratchet mechanism.

FIGURE 5 is an enlarged part cross-sectioned view of the operating rod, trunnion block and adjusting nut.

Figure 1:
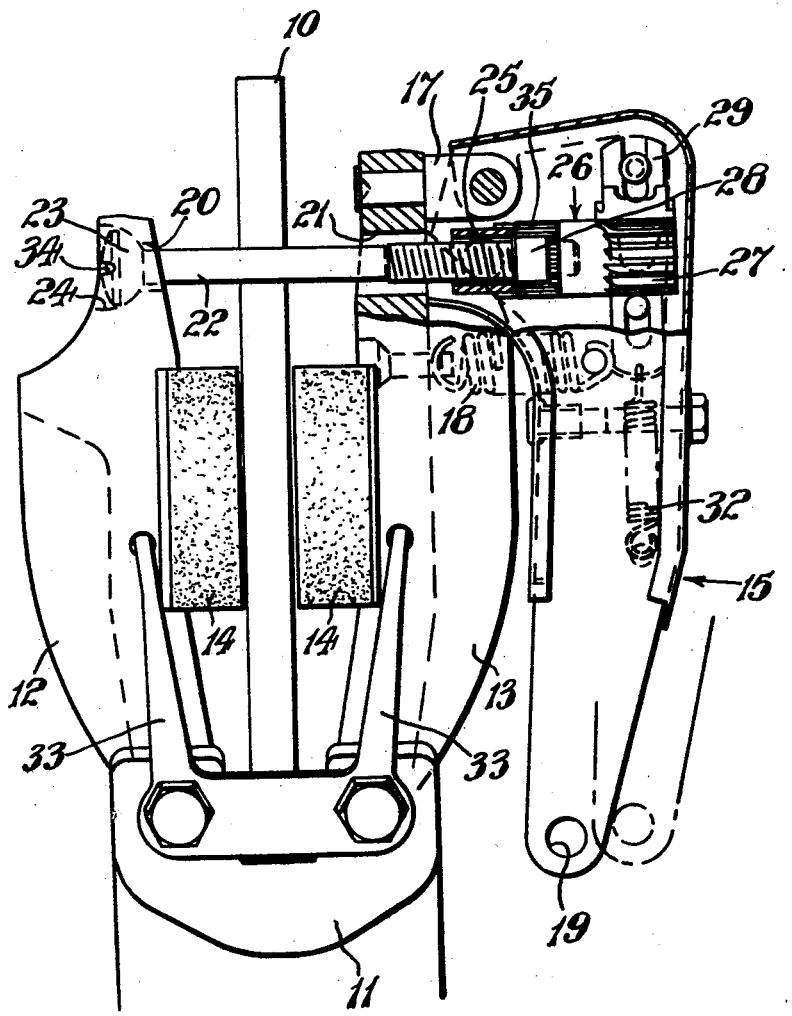
FIGURE 1 is a part cross-sectioned plan view of a disc brake incorporating a wear compensating device.
Figure 2:
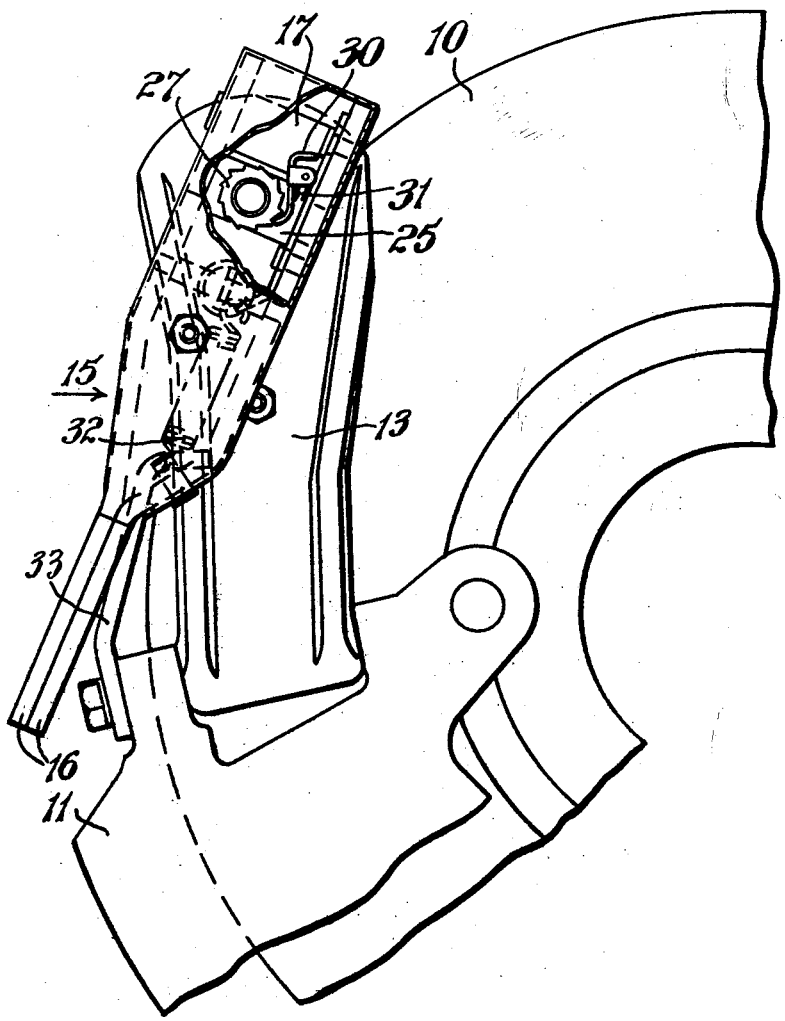
FIGURE 2 is a part cross-sectioned side view of the same disc brake.

A disc brake (FIGURES 1 and 2) comprises a rotatable annular disc 10 secured at its inner periphery to the wheel hub of a vehicle and rotatable therewith. A non-rotatable caliper 11 straddling the outer periphery of the disc 10 has pivotally connected thereto a pair of angularly movable pressure plates 12, 13 to which pads of friction material 14 are attached. Said pressure plates 12, 13 project tangentially from said caliper 11 to a location beyond said outer periphery.

A lever member 15 comprises a pair of arms 16 (FIGURE 2) joined together at one end and spaced apart and parallel to one another at the other end. The bifurcated end is pivotally secured to a lug 17 upstanding from the pressure plate 13 and a tension spring 18 is fitted between said lever member 15 and the pressure plate 13 so that said lever member 15 normally lies alongside said pressure plate. The lever member 15 is provided with a connecting means 19 for a hand branke cable or the like at the free end thereof, i.e. the end remote from the bifurcated end.

The two projecting ends of the pressure plates 12, 13 are each provided with holes 20, 21 through which an operating rod 22 extends axially adjacent the outer periphery of the disc 10. One end of said rod has a head portion 23 shaped to fit a complementary recess 24 in the pressure plate 12 adjacent the hole 20. The other end of the rod 22 is threaded and passes through hole 21 in the pressure plate 13 and then through a trunnion block 25 which is located between the bifurcated arms of the lever member 15. The rod 22 is prevented from rotating by a pin 34 which passes through the pressure plate 12 and engages in a slot 36 in the head portion 23.

Screwed to said threaded end of operating rod 22 on the inboard side of the trunnion block 25 is a nut 26 a portion of the outer periphery of which is formed as a ratchet wheel 27. The portion of the nut 26 which abuts the trunnion block 25 is serrated on its outer periphery 35 in order that a light friction spring 28 which bears against said serrated portion may prevent inadvertent rotation of the nut 26 on the operating rod 22.

A rectangular plate 29 is secured for limited sliding movement on one of the bifurcated arms 16 of the lever member 15 and pivotally secured to said rectangular plate 29 is a pawl 30 which is sprung outwardly from the said plate 29 and into engagement with a tooth of the ratchet wheel 27 by a spring 31. A tension spring 32 is provided to urge the rectangular plate 29 and hence the pawl 30 in a direction towards the free end of the lever member 15.

The limited sliding movement of the plate 29, prevents locking of the pawl 30 in the ratchet teeth of the ratchet wheel 27. Such locking may occur when the end of the pawl 30 slips into position abutting the face of a ratchet tooth and a heavy braking pressure has been applied to the rod 22 so that the pressure of the trunnion block against the nut 26 is sufficient to hold the nut 26 from turning. This would lock the brake in braking position even though the braking pressure on the lever member 15 were released. The limited sliding movement of the plate 29 permits the pawl 30 to move and the nut 26 to turn sufficiently to relieve the pressure of the trunnion block on the nut. The spring 18 does not exert sufficient force on the nut to prevent the nut from turning and the lever member 15 may then return to its inactive position permitting the nut to be rotated by the pawl 30 thereby advancing the nut to a new limiting position for the brake pads 14.

The brake is also provided with a means to retract the pressure plates 12, 13 a predetermined distance away from the disc 10 when the brake is disengaged and thus prevent the friction pads 14 from rubbing. The said means may consist of a deformable but slightly springy U-shaped wire member 33 secured at its base to said caliper 11 and the arms thereof being associated with each of said pressure plates 12, 13.

The operation of the brake is as follows. Angular movement of the lever member 15 away from its associated pressure plate 13 forces said pressure plate towards the disc 10 and at the same time, acting through the operating rod 22, draws the other pressure plate 12 towards the disc 10. This forces the friction pads 14 associated with both pressure plates 12, 13 into frictional engagement with the disc 10. As the friction pads 14 wear, the lever member 15 must make a greater angular movement to effect full frictional engagement. When a predetermined angular movement has been exceeded the spring loaded pawl 30 will click into an adjoining tooth on the ratchet wheel 27 so that, when the lever member 15 returns to the inoperative position, and the pressure plates 12, 13 take up their predetermined clearance, the nut 26 looses its frictional engagement with the trunnion block 25 and is thus free to be rotated by the pawl 30 and tension spring 32 in order to shorten the effective length of the operating rod 22 and hence compensate for wear of the friction pads 14. This action will continue until the friction pads require replacement.

If adjustment is necessary and, for some reason such as expansion of the disc 10 through heat, it is not immediately possible, then the tension spring 32 controlling movement of the plate 29 is put under tension to ensure that adjustment is effected as soon as conditions permit.

Having now described my invention, what I claim is:

1. A disc brake having a wear compensating mechanism and comprising a rotatable disc, a first pressure plate mounted on one side of said disc, a second pressure plate mounted on the opposite side of the disc, each said pressure plate having a friction element facing the opposed side of the disc, means pivotally supporting said pressure plates so as to permit their respective friction elements to frictionally engage the opposed sides of the disc, an actuating lever pivotally mounted on said second pressure plate, a trunnion box pivoted on the actuating lever, a tie rod non-rotatably secured to said first pressure plate and projecting beyond the periphery of the disc through the trunnion box, the portion of the tie rod projecting through the trunnion box being screw-threaded, a nut threaded onto the screw-threaded portion of the tie rod in abutment with the trunnion box, a latching member mounted on said lever for sliding movement relative thereto and positioned upon movement of the actuating lever from its inoperative position, beyond a predetermined amount, to engage said nut so that upon the return of the lever to its inoperative position the nut is rotated on the tie rod to shorten the length of the tie rod between the pressure plates.

2. The disc brake of claim 1 comprising a friction spring mounted on said trunnion box and frictionally engaging said nut.

3. The disc brake of claim 2 in which the surface of said nut engaged by said friction spring is serrated and said friction spring comprises leaf springs engaging said serrated part of said nut.

4. The disc brake of claim 1 in which the lever has bifurcated portions and said trunnion box has aligned trunnions journaled in said bifurcated portions.

5. The disc brake of claim 1 in which said latching member comprises a plate slidable on said actuating lever to engage said nut and rotate it on the release movement of said lever and a spring between said sliding plate and said lever biasing said sliding element in a direction to rotate said nut on said tie rod on release of said lever.

6. A slack adjusting means for brakes having a rotating element and fixed braking elements movable to and from frictional engagement with said rotating element which comprises an operating lever tiltable on a fixed axis to move the braking elements to frictional engagement with said rotatable element and reversely to retract said braking elements from frictional engagement with said rotating element, a rod to transmit braking force from said lever to the movable braking elements to move said elements to and from frictional engagement with the rotating element, a nut threaded on said rod and having ratchet teeth, a block secured on said lever in position to engage said nut, and a latching member mounted on said lever to engage successively the ratchet teeth of said nut to rotate said nut as successive teeth are engaged by said latching member and slidable on said lever to permit a slight reverse movement of said lever without rotation of said nut.

7. The slack adjusting means of claim 6 in which said block is a trunnion block pivoted on said lever on an axis parallel to the pivotal axis of said lever.

8. The slack adjusting means of claim 6 in which said latching means comprises a plate slidably mounted on said lever, a pawl on said plate, and a spring biasing said plate to a position to engage said pawl with a ratchet tooth.

References Cited in the file of this patent

UNITED STATES PATENTS

| | | |
|---|---|---|
| 1,875,065 | Lyman | Aug. 30, 1932 |
| 2,720,943 | Kershner et al. | Oct. 18, 1955 |
| 2,940,554 | Cameron | June 14, 1960 |

FOREIGN PATENTS

| | | |
|---|---|---|
| 186,645 | Great Britain | Sept. 29, 1922 |
| 1,207,766 | France | Sept. 7, 1959 |